Feb. 4, 1941. S. DUBERSTEIN ET AL 2,230,238
STERILIZER
Filed Aug. 23, 1937 3 Sheets-Sheet 1
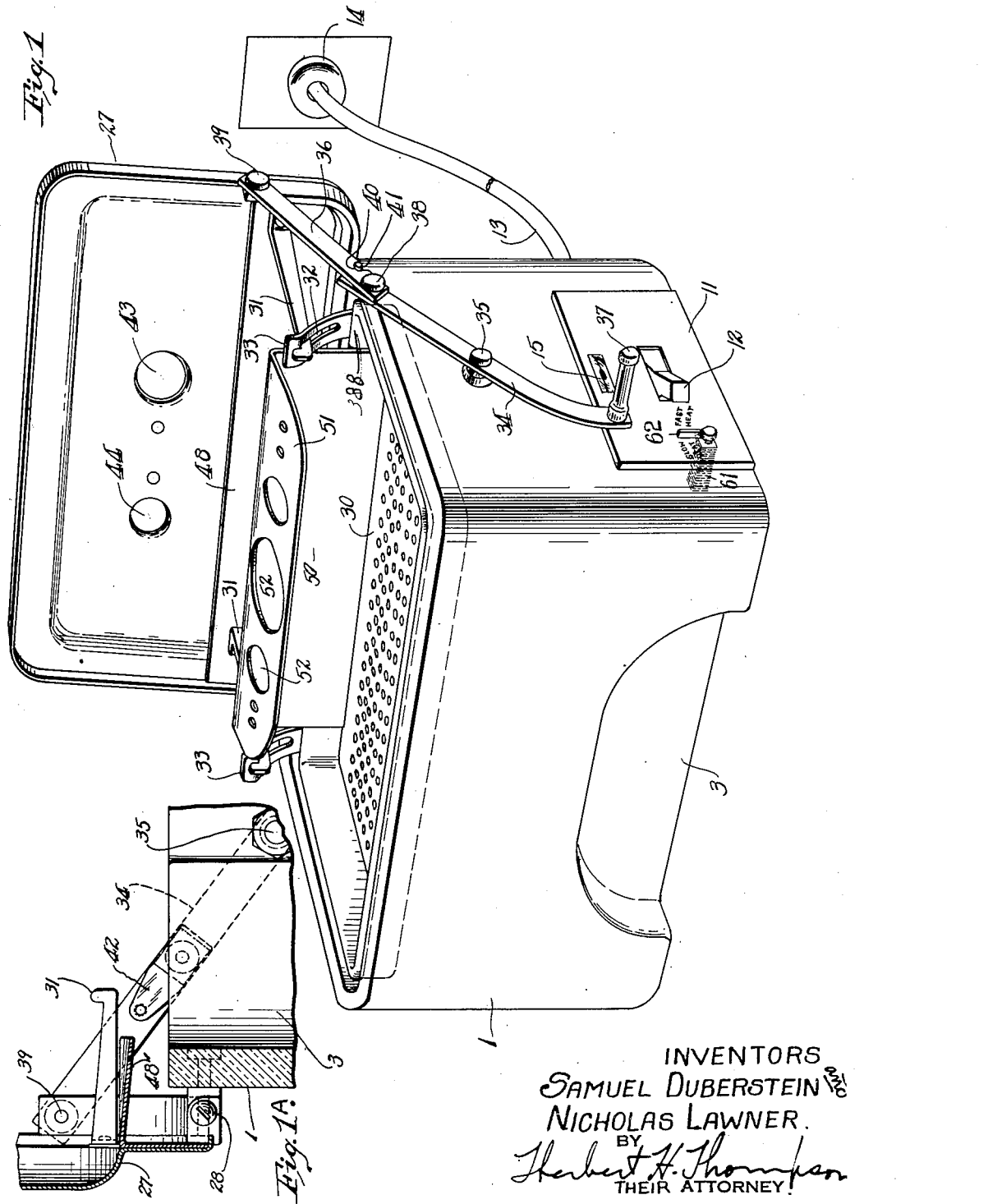
INVENTORS
SAMUEL DUBERSTEIN &
NICHOLAS LAWNER.
BY
Herbert H. Thompson
THEIR ATTORNEY.

Feb. 4, 1941. S. DUBERSTEIN ET AL 2,230,238
STERILIZER
Filed Aug. 23, 1937 3 Sheets-Sheet 2
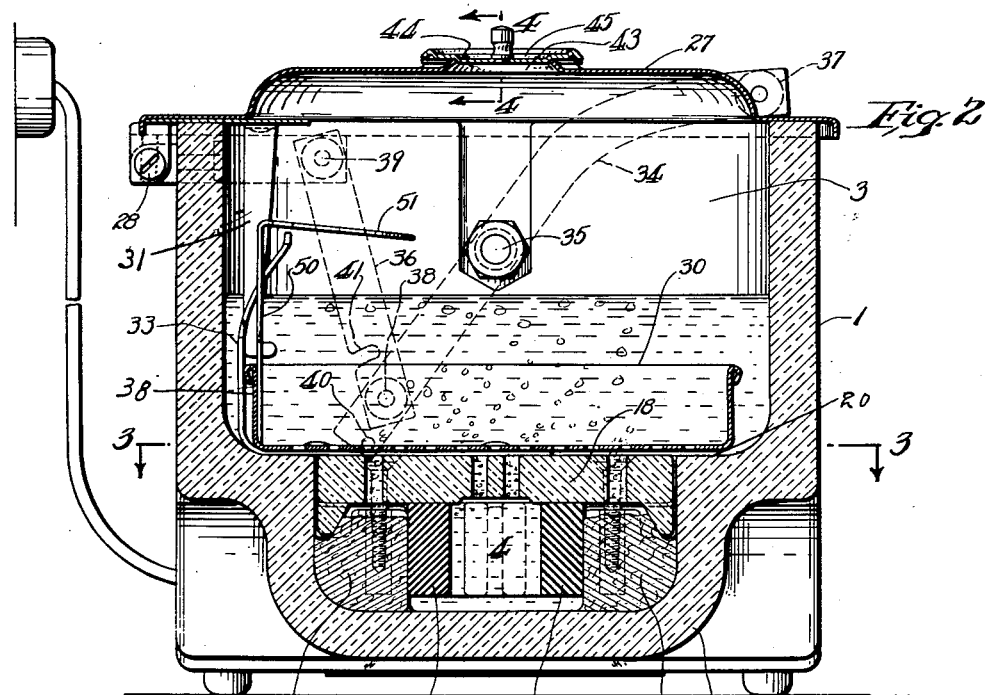
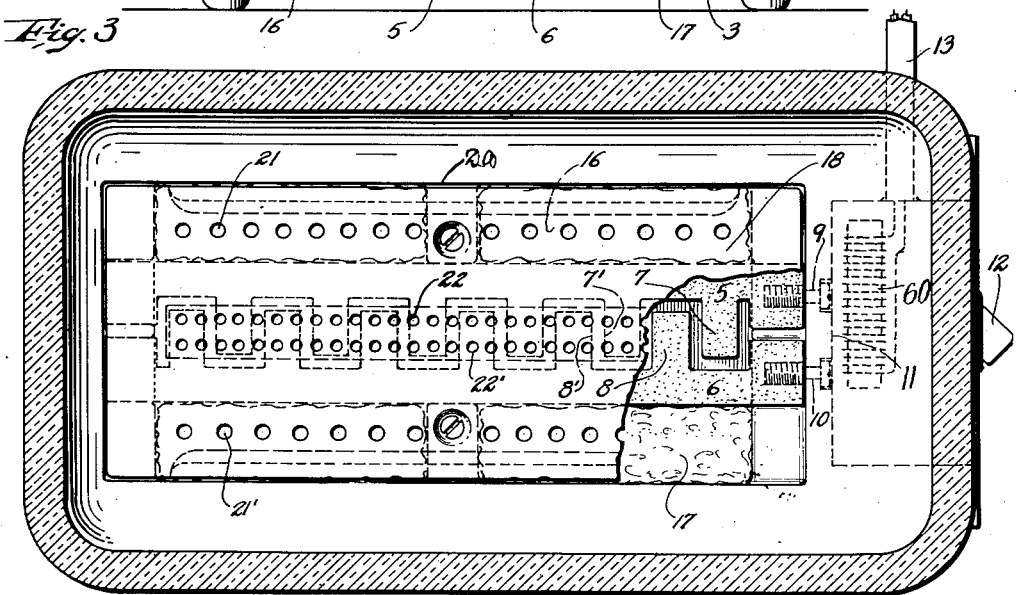
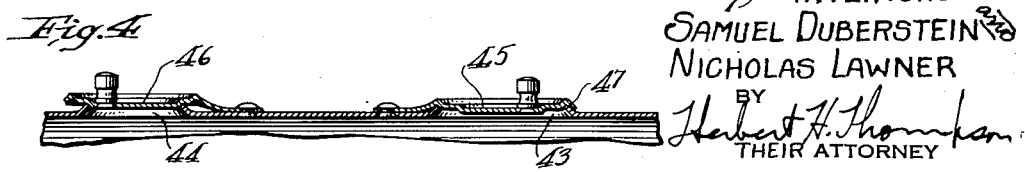
INVENTORS
SAMUEL DUBERSTEIN
NICHOLAS LAWNER
BY
Herbert H. Thompson
THEIR ATTORNEY Feb. 4, 1941. S. DUBERSTEIN ET AL 2,230,238
STERILIZER
Filed Aug. 23, 1937 3 Sheets-Sheet 3
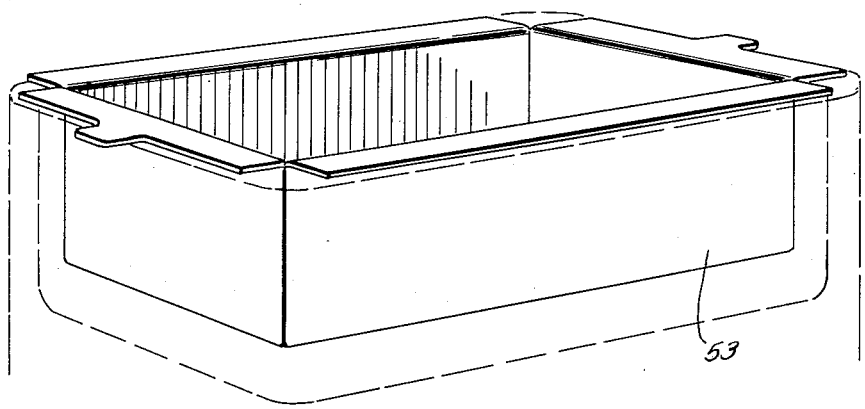
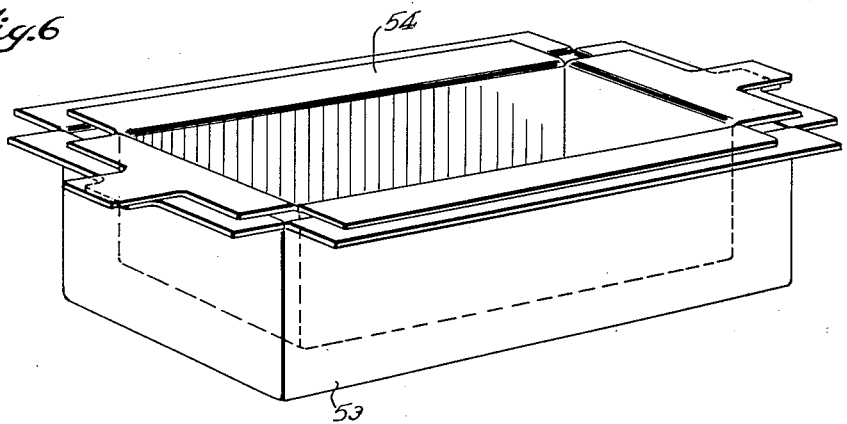
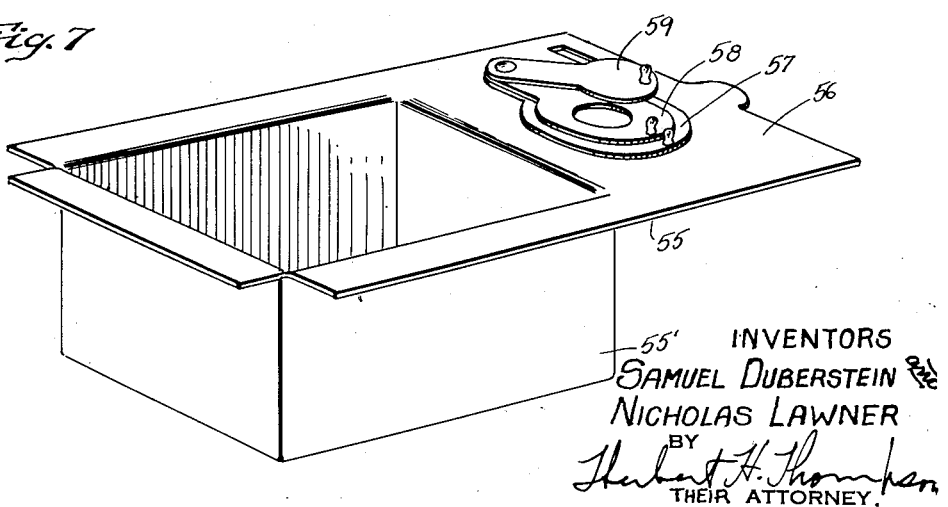
INVENTORS
SAMUEL DUBERSTEIN &
NICHOLAS LAWNER
BY
Herbert H. Thompson
THEIR ATTORNEY.

Patented Feb. 4, 1941

2,230,238

UNITED STATES PATENT OFFICE 2,230,238

STERILIZER

Samuel Duberstein and Nicholas Lawner, Brooklyn, N. Y., assignors to American Sundries Co., Inc., Brooklyn, N. Y., a corporation of New York Application April 23, 1937, Serial No. 138,493

4 Claims. (Cl. 219—40)

This invention relates especially to electrically heated sterilizers for sterilizing medical and dental instruments, although many features thereof are adapted for use in the general art of small cooking utensils, such as tea-kettles, double boilers, and the like. At present it is customary to make the sterilizing container of metal and to heat the water by a sealed resistance unit in the base. Such vessels corrode and discolor and the heating unit is many times ruined if it is allowed to boil dry.

According to our invention, we propose to make the vessel of porcelain or like refractory material and to make the heating unit also of porcelain, with full access of the water to electrode elements secured therein, the water being heated by the passage of the current through it as well as by the heating of the electrodes, whereby unusually rapid and efficient heating is obtained. In order that the heater may work substantially regardless of the chemical purity of the water used, we employ closely positioned carbon strips of interfitting saw tooth or corrugated juxtapositioned surfaces, as electrodes, providing ample exposed area.

A further improvement consists in the employment of means for preventing the sterilizer from drawing an excessive current in case the water contains more than normal ionization impurities. We also provide our device with a filter, such as cotton, which is immersed in the water and through which the water circulates, as it heats, to filter out sediment or carbon flakes.

In the drawings,

Fig. 1 is a perspective view of our sterilizer, with the lid open.

Fig. 1—A is a detail showing a modified form of latch for preventing accidental closure of the lid, and a modified form of cover.

Fig. 2 is a vertical section through the center of Fig. 1.

Fig. 3 is a transverse section taken approximately on line 3—3 of Fig. 2, looking in the direction of the arrows.

Fig. 4 is a detailed sectional view of the lid, taken approximately on line 4—4 of Fig. 2.

Fig. 5 is a perspective view of a second form of tray for use in our sterilizer.

Fig. 6 shows a double tray adapted for heating wax or the like, at temperatures below the boiling point of water.

Fig. 7 is a perspective view of still another form of tray, adapted for double use.

The main box or container 1 is preferably made in one piece of heavy porcelain, so as to be practically indestructible and readily cleaned without scouring. The box is shown as having a depressed central portion 3 forming a rectangular channel adapted to receive the heating unit 4. Said unit consists primarily of a pair of carbon strips 5 and 6 of rectangular cross section and having their inwardly facing surfaces provided with alternate tooth-like projections 7, 7' and 8, 8', leaving substantially uniform vertical spacing between the strips at all points. By this means, a maximum surface is exposed to the water within the limited space available. With this arrangement, it is not necessary to add salt to the water to obtain rapid heating, since, with the large surface exposure and close juxtaposition of the electrodes, practically all tap water will conduct sufficient current to heat up rapidly.

At their forward ends, each electrode is electrically coupled to threaded posts 9 and 10 leading within junction or switch box 11, within which are located the usual switch 12 and wires 13 connecting the posts 9 and 10 to the supply plug 14. Preferably, a small lamp 15 is provided to show when the current is on.

We also preferably place outside of each electrode loose cotton 16 and 17, or other porous material to filter the water. Over the electrode and cotton we place a porcelain cover plate 18 which rests on projecting corner pieces 19 in the heating space 3. In place, plate 18 forms a false bottom for the box and is on a level with the shoulders 20 therein. Said plate is provided with a plurality of rows of perforations 21, 21' and 22, 22', the outside pair being over the cotton 16 and 17 and the inner pair over the inner surfaces of the electrodes. When heating, the colder water descends through the outer holes, passes under the electrodes, which are spaced from the bottom of the box as shown in Fig. 2, and rises, as it is heated, between the electrodes and out the central holes. Preferably the two inner rows of perforations 22 which lie over the space between the electrodes are quite restricted in diameter, as shown.

The lid 27 of the box may be of metal and is hinged thereto by hinges 28. Within the box we may provide a perforated metal tray 30 for holding the instruments or other articles being sterilized. Means are also provided for lifting the tray out of the water when the lid is opened. To this end we provide a hook or hooks 31 on the bottom of the lid which extend at an angle thereto through slots 32 in ears 33 extending upwardly from the back 38 of the tray. In the closed position of the lid, the tray rests on the bottom and the hooks lie adjacent the back of the tray (see Fig. 2), but as the lid is opened, the hooks first slide upwardly through the slots 32 and then lift the tray above the water, where it is held as long as the lid remains open.

For opening and closing the lid, we have shown a small crank 34 hinged at 35 to the side of the box and connected to the lid through a toggle link 36. In the closed position, the toggle takes the position shown in dotted lines in Fig. 2. To open the lid, the operator presses down on handle 37 so that when open, the three pivot points 35, 38 and 39 are in line, or point 38 moved slightly above alignment with the others. A stop pin 40 on crank 34, engaging a notch 41 in toggle 36, may be used to prevent further movement and to assist the toggle in preventing accidental closing of the lid. To this end, we also may provide a leaf spring 42 on crank 34, having a small button thereon for engaging a depression on the inner surface of line 36 when the pivot points are aligned. (Fig. 1—A.)

Holes 43 and 44 may be provided in the top so that test tubes and the like may be inserted therein without opening the lid. Hinged caps 45 and 46 are provided for the holes. Preferably, the rims 47 of the holes are slightly elevated so that the caps will swing clear of the top, when opened, and not scratch its surface.

On its underside, the lid is provided along its bottom with a shelf 48 which extends upwardly when the lid is open beyond the back wall of the box. The purpose of the shelf is to catch the condensed steam which runs down the lid when it is raised, and to cause it to drip back into the container. This shelf is preferably above the hinges of the lid.

The trays used with our sterilizer may assume various forms. Tray 30 is shown as having a perforated bottom and an upstanding back piece 50 having a forwardly extending shelf 51 provided with holes 52 to support the handles of instruments or test tubes, etc.

Fig. 5 shows a sheet metal tray 53 without perforations, which may be used to heat or sterilize articles without their coming in contact with water.

If a temperature below 212° is desired, double trays 53 and 54 may be used, one within the other. This is useful to dentists for softening wax for making dental impressions, etc.

Fig. 7 shows a combination tray 55, wherein one part 55' operates as in Fig. 5, while the other part 56 is in the form of a cover with a hole therein. This may be adapted to receive different size tubes by having hinged adjacent the same a plurality of superimposed caps 57 and 58 having graduated openings, the top cap 59 closing the uppermost hole.

Owing to variations in the chemical purity of water from place to place, it may be desirable to provide a variable resistance in series with the electrodes to limit the maximum current drawn. To this end, we may employ a resistance 60 having a rapid rise with current (Fig. 3). Or we may employ a variable resistance 61, such as a carbon pile, which is varied by turning screw piece 62 (see Fig. 2), so that the user can regulate the current consumption and rate of heating.

Besides showing an improved form of spring latch, Fig. 1—A also shows an improved form of shelf 48' on the bottom of the lid for catching the condensed steam. In this form of the invention, the shelf extends inwardly when the lid is raised, along the bottom of the lid above the hinges, and projects over the adjacent edge of the box, thereby dripping the water running off the lid back into the box and preventing water from running outside of the box when the lid is opened.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. An immersion sterilizer comprising a main body portion, a downward extension of less cross sectional area than the body portion, and a heating unit detachably mounted within said extension comprising a perforated top for said extension, forming the bottom of the body portion, spaced conducting bars of rectangular cross section secured edge-on under said top for heating the water by passing current therethrough and extending substantially the length of said extension, and absorbent material between the outside of each bar and the inner wall of said downward extension for filtering the water as it descends therethrough.

2. An immersion sterilizer comprising a main body portion, a downward extension of less cross sectional area than the body portion, a top for said extension having restricted perforations, forming the bottom of the body portion, spaced conducting bars under said top for heating the water by passing current therethrough, and extending substantially the length of said extension, said bars being of complementary zigzag shape and of substantial depth, giving a narrow vertical passage between said bars to promote rapid circulation, and absorbent material around said bars to filter the water as it circulates.

3. In an immersion sterilizer, the combination with a porcelain box or container adapted to contain water, of a pair of spaced carbon elements of rectangular cross section near but spaced from the bottom of said box and extending substantially the length of the box, a porcelain support for said elements, to the bottom of which said elements are secured, said support having restricted apertures therethrough, said elements having complementary projections on the inner surface of each, giving large exposed areas extending a substantial depth into the water, and absorbent material packed loosely behind and against the outside of said elements whereby the water is filtered as it circulates.

4. A sterilizer comprising a receptacle for a sterilizing liquid, electrodes in the bottom of said receptacle for passing an alternating current directly through said liquid to heat it to sterilizing temperature, a perforated support fixed in the bottom of the receptacle above the electrodes forming a false bottom and adapted to support articles to be sterilized in the sterilizing liquid, and filter means between the electrodes and said support in the path of liquid circulation for removing from the liquid any material disintegrated from the electrodes.

SAMUEL DUBERSTEIN.
NICHOLAS LAWNER.